United States Patent [19]

Mooney

[11] 4,181,463
[45] Jan. 1, 1980

[54] VEHICULAR JACK

[76] Inventor: Robert A. Mooney, 35 Friendship La., Colorado Springs, Colo. 80904

[21] Appl. No.: 808,265

[22] Filed: Jun. 20, 1977

[51] Int. Cl.² .......................... B60P 1/04; B62B 1/14
[52] U.S. Cl. .................................. 414/490; 104/97; 280/47.28
[58] Field of Search .............. 280/47.27, 47.28, 47.29; 214/370, 384, 147 R, 653, 512, 513; 254/2 R, 2 B, 108, 133; 17/44, 44.3; 104/97

[56] References Cited

U.S. PATENT DOCUMENTS

| 2,724,519 | 11/1955 | Hayes | 280/47.29 X |
| 2,738,086 | 3/1956 | Reich | 214/384 |
| 3,045,851 | 7/1962 | Rupert | 214/653 |

Primary Examiner—John A. Pekar
Attorney, Agent, or Firm—Richard W. Hanes

[57] ABSTRACT

The present invention relates to a wheeled carrier for sides of meat and more particularly to a dolly having a vertically adjustable hook supporting mast to lift and carry larger pieces of meat from a hanging position to a cutting area.

1 Claim, 3 Drawing Figures

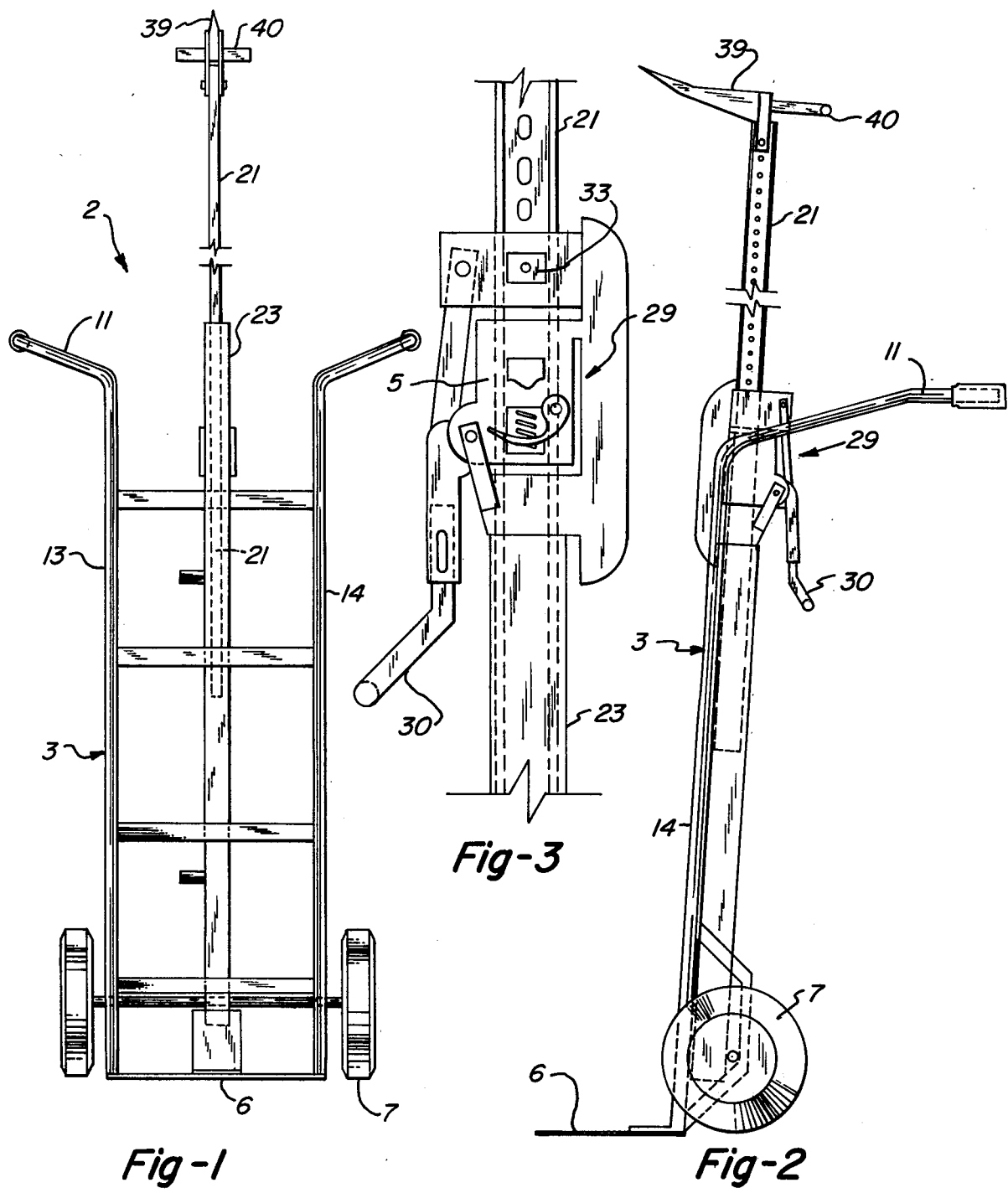

VEHICULAR JACK

The primary object of the invention is to provide apparatus which will enable a single individual to remove a heavy side of meat or similar article from an overhead or raised storage position and transport it from one position to another.

Other objects, features and advantages of the invention will become apparent upon a reading of the following detailed description of a preferred form of the invention taken in connection with the accompanying drawings in which:

FIG. 1 is a front elevational view of the vehicular jack of the present invention.

FIG. 2 is a side elevational view of the vehicular jack of the present invention.

FIG. 3 is an enlarged fragmentary side view showing the jacking mechanism of the vehicular jack of the present invention.

Typically, sides or quarters of meat are processed to an overhead conveyor or storage rack comprising a series of movable or stationary hooks which pierce and support the meat. At such time as it is desired to remove a side or quarter and transport it elsewhere, it becomes necessary to lift the meat to remove it from its supporting hook and then hold it in an elevated position while it is being transported. Once arrived at the cutting block or other location, it must be lowered onto the table surface or another hook device.

Of course, lifting and transporting facilities to accomplish these objectives are available in several large and sophisticated forms, however, the dolly 2 of the present invention is designed to exemplify simplicity and ease and economy of construction, being operable without an engine and by one person.

FIGS. 1 and 2 show a substantially conventional two-wheeled dolly 2, having a vertically oriented frame 3 mounting a carrying and stablizing platform 6 at the lower end thereof. A pair of wheels 7 are mounted on an axle 9 attached to the lower part of the frame. Handle bars 11 are provided by rearwardly and outwardly protruding extensions of the side members 13 and 14 of the frame 3.

A jacking mast 21 is slidably disposed in a rectangular tubular housing 23, which housing is secured to the dolly frame 3 along the center line of the frame. Secured to the housing 23 is a lever and ratchet assembly 29 typical of many known jacks and jacking mechanisms. In a manner well known in the art, a handle 30 and the attached lever engage the jacking mast to lift it in increments as an operator moves the handle up and down. A locking mechanism 33 cooperating with the ratchet assembly 29 provides repeated lifting or lowering increments as the jack handle is operated.

At the top of the jacking mast is attached a long stainless steel carrying hook 39 for piercing the piece of meat to be lifted and carried, together with a handle 40 to provide a grip for guiding and engaging the hook.

In operation, the dolly is wheeled into position next to the side of meat to be carried. The carrying hook is raised by operating the jack and the hook is thrust into the side of meat. Further raising of the carry hook by operating the jack disengages the side from the hook upon which it is hanging, after which the side is wheeled by the dolly to its desired position and lowered.

I claim:

1. A hand truck for lifting and carrying penetratable objects comprising,
   a frame including a pair of parallel spaced apart, upright, rigid, tubular members having upper and lower portions and whose upper portions are disposed at an angle to the lower portions and outwardly from each other at a divergent angle;
   a pair of ground engaging wheels;
   axle means attached to the lower portion of the said frame and mounting said wheels for rotation;
   a stabilizing platform rigidly connected to the lower portion of the frame, said platform disposed tangentally to the periphery of the said wheels;
   web means interconnecting the upright tubular members;
   a straight tubular housing attached to the said web means intermediate the said tubular member and parallel therewith;
   a mast slidably disposed in the tubular housing;
   jacking means, including a pivotal handle, interconnecting the tubular housing and the slidable mast;
   spike means connected to the top of the mast and projecting forwardly therefrom and over the said platform; and
   a handle attached to the spike means and projecting rearwardly therefrom.

* * * * *